United States Patent [19]
Leeb

[11] Patent Number: 5,143,492
[45] Date of Patent: Sep. 1, 1992

[54] DEVICE AND TOOL BIT FOR CUTTING ALL KNOWN TYPES OF THREADS (EXCEPT BUTTRESS THREAD) IN ONE SINGLE WORK PROCESS

[76] Inventor: Felix Leeb, Zum Espat 3, 8388 Mettenhausen, Fed. Rep. of Germany

[21] Appl. No.: 726,711

[22] Filed: Jun. 27, 1991

Related U.S. Application Data

[63] Continuation of Ser. No. 601,041, Oct. 23, 1990, abandoned, which is a continuation of Ser. No. 322,771, Mar. 13, 1989, abandoned.

[30] Foreign Application Priority Data

Mar. 30, 1988 [DE] Fed. Rep. of Germany ....... 3810884

[51] Int. Cl.$^5$ .............................................. B23C 3/32
[52] U.S. Cl. ........................................ 409/74; 409/71; 470/199
[58] Field of Search ............ 409/65, 71, 74, 76, 409/77, 78; 51/43, 288, 245; 408/150, 151, 222, 26; 10/140, 141 R

[56] References Cited

U.S. PATENT DOCUMENTS

| | | | |
|---|---|---|---|
| 1,237,255 | 8/1917 | Schmidt | 51/43 |
| 1,252,162 | 1/1918 | Paver et al. | 51/43 |
| 1,263,559 | 4/1918 | Kaetker | 51/43 |
| 1,316,718 | 9/1919 | Hall | 51/43 |
| 1,408,578 | 3/1922 | Garner | 51/43 |
| 1,562,969 | 11/1925 | Jordan et al. | 51/43 |
| 2,451,497 | 10/1948 | Kratchman | 409/74 |
| 3,690,220 | 9/1972 | Escobedo | 409/74 X |
| 4,125,057 | 11/1978 | Cox | 409/74 |
| 4,761,844 | 8/1988 | Turchan | 408/222 X |
| 4,930,949 | 6/1990 | Giessler | 409/74 X |
| 4,934,040 | 6/1990 | Turchan | 408/26 X |
| 4,943,191 | 7/1990 | Schmitt | 408/222 X |
| 5,080,538 | 1/1992 | Schmitt | 10/140 X |

FOREIGN PATENT DOCUMENTS

| | | |
|---|---|---|
| 8800507 | 1/1988 | European Pat. Off. . |
| 1923272 | 12/1969 | Fed. Rep. of Germany . |
| 2346809 | 4/1975 | Fed. Rep. of Germany . |
| 2516775 | 10/1976 | Fed. Rep. of Germany . |
| 3527971 | 3/1987 | Fed. Rep. of Germany . |
| 469152 | 7/1914 | France . |
| 58-192718 | 11/1983 | Japan . |
| 59-30617 | 2/1984 | Japan . |

Primary Examiner—Larry I. Schwartz
Assistant Examiner—Robert Schultz
Attorney, Agent, or Firm—Anderson Kill Oshinsky

[57] ABSTRACT

A description is given of equipment for the production of screw-threaded drilled holes (tapped holes) of variable diameters in solid materials in a single-pass operation with the use of an integrated cutting tool and with the use of a commercially-available hand-drilling machine having an electronically-controlled motor drive, or any other type of drive, where the equipment includes a tool spindle which may be attached to the drive shaft of a hand-drilling machine or the like, and which is radially displaceable in relation to its axis and accommodated in a cylindrical housing for the spindle, where the position of said spindle housing may be adjusted axially in a specified manner by means of a screw device in a holder which may be mounted on the tool and has arrangements, on the one hand, for limitation of the axial travel of the tool and, on the other hand, for adjustment of the desire diameter of the tapped hole which is to be produced.

17 Claims, 3 Drawing Sheets

DEVICE AND TOOL BIT FOR CUTTING ALL KNOWN TYPES OF THREADS (EXCEPT BUTTRESS THREAD) IN ONE SINGLE WORK PROCESS

This is a continuation application of Ser. No. 07/601,041 filed Oct. 23, 1990 and now abandoned, which in turn is a continuation application of Ser. No. 07/322,771 filed Mar. 13, 1989 and now abandoned.

BACKGROUND OF THE INVENTION

The present invention relates to equipment for the production of screw-threaded drilled holes (tapped holes) of variable diameters in a single-pass operation with the use of an integrated cutting tool for similar types of threads which have a similar pitch [Example : M 14 and M 16 or M 18−20+M 22 (M = metric thread)]and with the use of a commercially-available hand-drilling machine having a electronically-controlled motor drive, or any other type of drive, the speed of rotation of which may be regulated in order to adapt it to the nature of the material being worked with. In addition, the invention also relates to a tool which is suitable for general use in CNC-controlled (Computer Numerical Control) milling machines and drilling machines from 2½-D upward, more particularly in combination with a device which may be attached to a hand-drilling machine or the like for the production of tapped drilled holes in solid materials with the possibility of infinitely variable adjustment of the thread clearance. The objective of this method of working is to produce the core hole and the screw-thread in a single-pass operation.

Tapped drilled holes are produced in solid material either by preliminary drilling and subsequent tapping, or else by means of a so-called tapping drill in a single-pass operation. The first of these methods is time consuming and therefore expensive, but the other known method is only suitable for tapped drilled holes of limited diameter and its use is restricted to holes which are open at both ends. In addition to this, the known methods of working require the use of a tool of specific dimensions corresponding to the diameter of the particular tapped hole required. In many cases, especially for screwing into relatively soft materials, wood for example, it is additionally desirable for the diameter of the tapped hole to be made slightly smaller than the diameter of the screw-threaded bolt to be used, so that when the bolt is screwed in there will be a certain amount of compression of the material in the threaded region. In the methods formerly employed, expensive special tools were required which added greatly to the cost of the operation. For this reason there is a dearth of equipment with which, despite the integrated equipment and the use of an integrated tool, tapped holes of different diameters with different types of threads can be produced in solid materials without involving time-consuming and expensive operations.

SUMMARY OF THE INVENTION

The present invention therefore has the objective of creating a device which is easy to operate and is not expensive, with which it is possible for unskilled operators to produce tapped holes of different diameters with different types of threads in solid materials (blind holes) in a single-pass operation with the use of commercially-available hand-drilling machines and the use of an integrated tool, without involving time-consuming operations. It is an additional objective of the present invention to provide a tool which is suitable for the production of tapped holes in solid material and which can be used not only on electronic CNC-controlled processing machines but also, and in particular, in combination with a device which has still to be provided.

The first part of this objective is reached with equipment which is characterized in that it has a tool spindle, which may be attached to the drive shaft of a hand-drilling machine or the like, and which is radially displaceable in relation to its axis and accommodated in a cylindrical housing for the spindle, where the position of said spindle housing may be adjusted axially in a specified manner by means of a screw device in a holder which may be mounted on the tool, and in that the spindle housing may be driven in rotation by the tool spindle by way of a geared drive coupling within the holder.

Because of the rotational drive by the tool spindle by way of the geared drive coupling, the spindle housing is moved downwards by means of a screw device in the holder with a specific step-down effect, in such a manner that, together with the spindle housing, the tool spindle, and therewith the tool itself, is lowered progressively towards, or into, the piece of material being operated on, in which case the screw device takes care of the necessary pre-established rate of lowering corresponding to the pitch of the thread of the screw device, so that the tool produces a thread with the same pitch in the target material.

When the working depth, predetermined by the length of the screw device, has been reached, a torque cut-off device interrupts the drive mechanism so that no further advance of the tool spindle, together with the tool, can take place.

The adjustment for the particular desired diameter of the tapped hole is effected by means of the adjustable eccentric plates which support the tool spindle in relation to the spindle housing, and which make possible the radial displacement of the tool spindle in relation to the axis of the spindle housing. In order to achieve only a slight axial resistance of the tool, the end of the cutter is free at the middle, but this does not allow any further direct penetration into the solid material. In order to prevent breakage of the cutter and, in spite of this, to make further penetration into the material possible, the pathway of the cutter (offset towards the middle) must not be able to be adjusted to be smaller than the extent to which the cutter is free at the middle. This is achieved by having recesses to accommodate the tool spindle in the eccentric plates, which are used for the radial displacement of the tool spindle in relation to the axis of the spindle housing, arranged in such a way that their axes, if there is no displacement, can coincide with the axis of the spindle housing and therefore the tool will always operate in rotation around the axis of the spindle housing. The displacement of the eccentric plates is delegated to a manually-operated spindle gear.

In addition, it is possible to make provision for the drive of the spindle housing to be switchable between forward and reverse running.

With the equipment in accordance with the present invention it is possible, with the use of a standardized tool, to produce tapped holes of different diameters, in particular tapped holes which, when compared with the conventional metric or inch-measure threads, will be undersized to a lesser or greater extent, or may be oversized as occasion demands. The provision of appropriate read-off or calibration scales, makes it possible at all times, even for unskilled personnel, to operate the equipment in accordance with the present invention, without time-consuming effort, because the running of the equipment, in combination with a limit switch, is fully-automatic and incorporates cooling of the cutter tool and removal of the milling chips with the use of compressed air.

The second part of this objective is reached with a tool which is generally configured as a face-milling cutter, the cutters of which are arranged for left-hand cutting for down-milling, and in which at least two radially projecting thread-cutting teeth are disposed at a distance above the face-milling cutter. In contrast to the conventional up-milling, the down-milling imparts an outstandingly good quality to the surface, which is actually of great importance for the production of tapped holes. The cutting height of the cutters of the face-milling cutter corresponds to at least the single pitch of the thread being cut, but it should always retain the dimensions of one thread pitch even after all possible grinding operations, for which reason the initial dimension should be approximately 1½-times this value. Naturally, with the utilization of milling machines having turnover plates, a cutting height which corresponds to the pitch of the thread to be produced is adequate.

An additional essential feature of the invention resides in the fact that the thread-cutting teeth are arranged in a plane at right angles to the axis of the milling machine.

In a further development of the invention, there is a peripheral groove of small width and depth located above the cutters of the face-milling machine to act as a chip breaker and the face-milling machine has a central cutting-free space, and its cutters, in the peripheral region of the milling cutter, pass over, with a curvature of small radius, into the axially-directed peripheral surface region.

DISTRIBUTION OF TASKS

The production of the core holes devolves upon the cutters of the face-milling machine. The production of the turns of the thread has to be effected by the thread-cutting teeth which are of a shape and length that exactly match the profile and depth of the particular thread under consideration.

BRIEF DESCRIPTION OF THE DRAWINGS

An example of the invention will now be described in greater detail with reference to the accompanying drawings, in which.

DETAILED DESCRIPTION OF THE PREFERRED EMBODIMENTS

Figure 1:
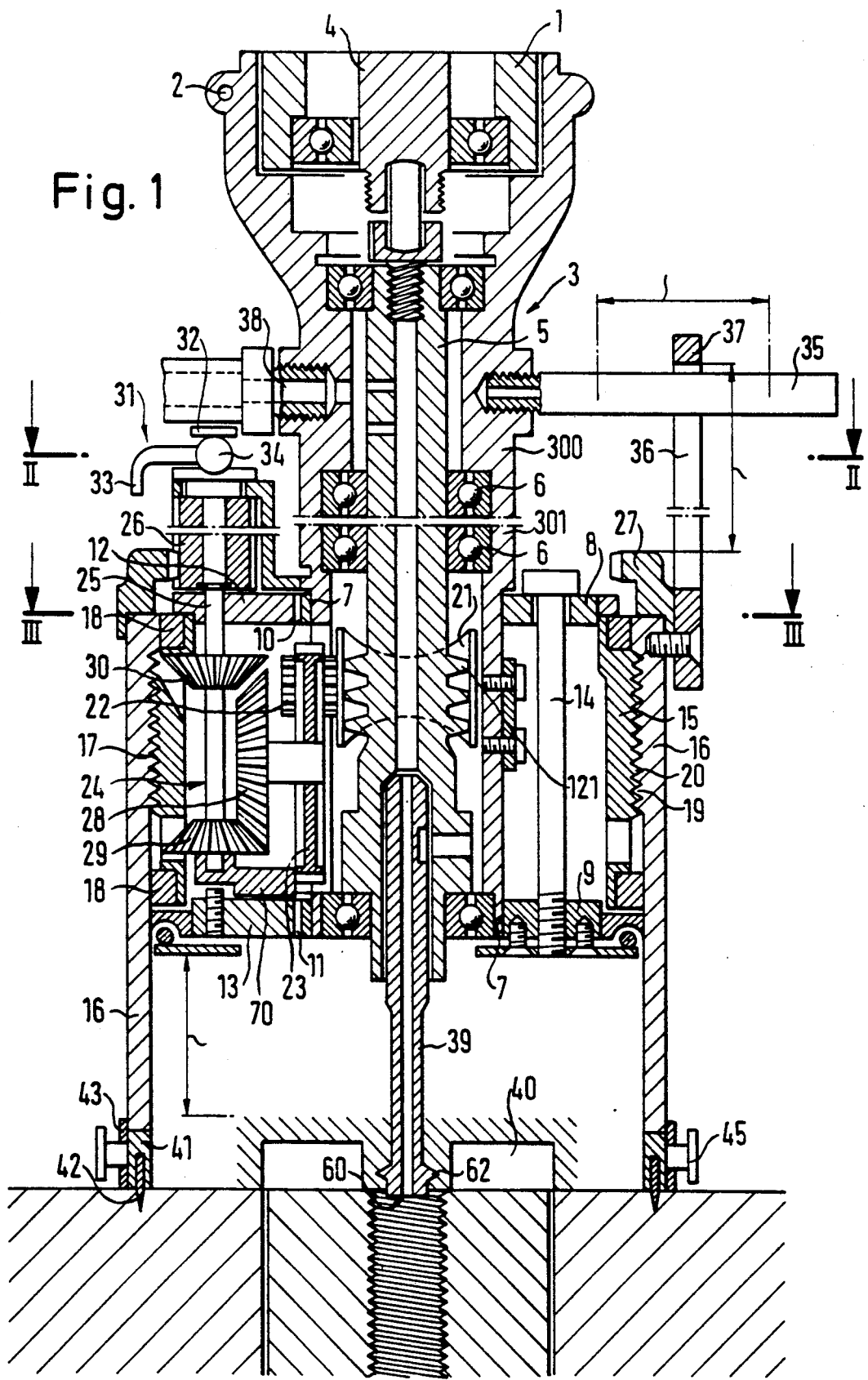
FIG. 1 is a longitudinal section through equipment in accordance with the present invention for the production of tapped holes in solid material.

Attached to the housing 1 of a conventional commercially-available electric hand-drilling machine, by means of a screw clamp 2, there is a sleeve 3 which accommodates a tool spindle 5 which can be coupled to the drive shaft 4 of the hand-drilling machine. The tool spindle 5 is supported in the sleeve 3 by means of ball bearings 6. By way of the sleeve 3, the tool spindle 5 is mounted in recesses 7 in the two eccentric plates 8 and 9. The eccentric plates 8 and 9, in their turn, are accommodated, to be able to rotate, in recesses 10 and 11 in a cover plate 12 and a base plate 13 of a cylindrical housing 15 which forms a so-called spindle housing. Furthermore, the eccentric plates 8 and 9 are non-rotatably joined together, in the depicted example of embodiment, by means of bolts 14 and the sleeve 3. By means of the eccentric plates 8 and 9, the tool spindle 5 can be displaced radially in relation to the axis of the spindle housing 15, so that it is possible to produce tapped holes of different diameters. Allocated to the function of rotating the eccentric plates, which are rotatably mounted in the spindle housing, there is a spindle drive 50 which encompasses a threaded spindle 53 attached to a stud 52 mounted on the eccentric plate 8 or 9, by way of an eye 51, as well as a spindle nut 54, in which case the spindle nut 54 is supported against a counter-thrust bearing 56 which is rotatably mounted on the cover plate 12 of the spindle housing 5. As may be seen particularly well in FIGS. 2 and 3, the recesses 10 and 11 for accommodation of the sleeve 3, or parts of this sleeve, are arranged in such a manner in the eccentric plates that the axis 57 of the tool 39 or of the tool spindle 5, when there is no adjustment of the eccentric plates 12 and 13, can coincide with the axis 58 of the spindle housing, so that the tool 39, at any arbitrarily selected setting, will always operate in gyration around the axis 58 of the spindle housing 15.

The spindle housing 15, in the illustrated example of embodiment, is supported to be axially displaceable in the tube-shaped holder 16 by means of a screw device 17. Furthermore, the spindle housing 15 is provided with two guide rings 18 which are located at its upper and lower end respectively where they are in contact with the inside peripheral surface of the tube-shaped holder 16. The screw device 17 includes an internal thread 19 located on the tube-shaped holder 16 and an external thread 20 located on the spindle housing 15. The spindle housing 15 can be driven to rotate within the holder 16, in which case the tool spindle 5 is fitted with a worm gear 121 which meshes with a worm wheel 21, and this worm wheel 21 drives a bevel gear 24 by way of the pair of intermeshing gears 22, 23. This bevel gear 24 drives a pinion 26 mounted on the shaft 25 and this pinion meshes with the internally-toothed crown wheel 27 which is mounted on the upper end surface of the holder 16. The bevel gear 24 comprises an input gear wheel 28 and two output gear wheels 29 and 30 which can respectively be made to engage with the input gear wheel 28 for forward and reverse driving of the spindle housing 15. For this purpose the gear wheels 29 and 30 are mounted to be axially displaceable along the shaft 25, but this is not shown in detail in the drawing.

A torque cut-off device 31 is provided to limit the working depth of the equipment and, when the maximum permissible working depth is reached, this device interrupts the rotary drive of the spindle housing 15. In the illustrated example of embodiment, the torque cut-off device comprises a nut 32 which can be screwed onto the shaft 25 and an eccentric 34 which has a cantilever arm 33 and, with this arrangement, the pinion 26 is positively locked onto the shaft 25 because of the pressure exerted on the eccentric 34 by means of the nut 32 and the eccentric 34 is moved into a non-operational position by means of the cantilever arm 33 when the maximum permissible working depth has been reached so that the positive locking of the pinion 26 onto the shaft 25 is released and thus the rotary drive of the spindle housing 15 is interrupted. To bring this about, the cantilever arm 33 acts in conjunction with the upper surface of the crown wheel 27. In the illustrated example of embodiment, the crown wheel 27 is seated on the upper end surface of the tube-shaped holder 16. In the illustrated example of embodiment, the sleeve 3 which accommodates the tool spindle 5 is fabricated from two separate parts and comprises an upper part 300 which may be attached to the housing 1 of the driving machine and a lower part 301 which is permanently housed in the spindle housing 15.

Affixed to the upper part 300 of the sleeve 3, there is a radially projecting support rod 35 which engages in a vertically directed longitudinal slot 36 of a stirrup 37 which is attached to the holder 16 and together with this forms a torque back-up. The support rod is axially and radially displaceable in the longitudinal slot 36. On the upper part 300 of the sleeve 3, there is also a radial connection 38 for compressed air through which the compressed air is introduced into the tool spindle 5 and through this into the lower region of the spindle 5 and thus into the operational site of the tool 39. To allow the compressed air to escape, and for removal of the metal chips, an outlet opening 40 is provided at the lower end of the holder 16. On the lower end of the holder 16, as illustrated in the example of embodiment in FIG. 1, there is a ring 41, with pointed adjustable centring pins 42 projecting downwards from it, by means of which the holder 16 can be mounted in a precisely orientated position on the piece of material upon which the work is to be performed.

Figure 2:
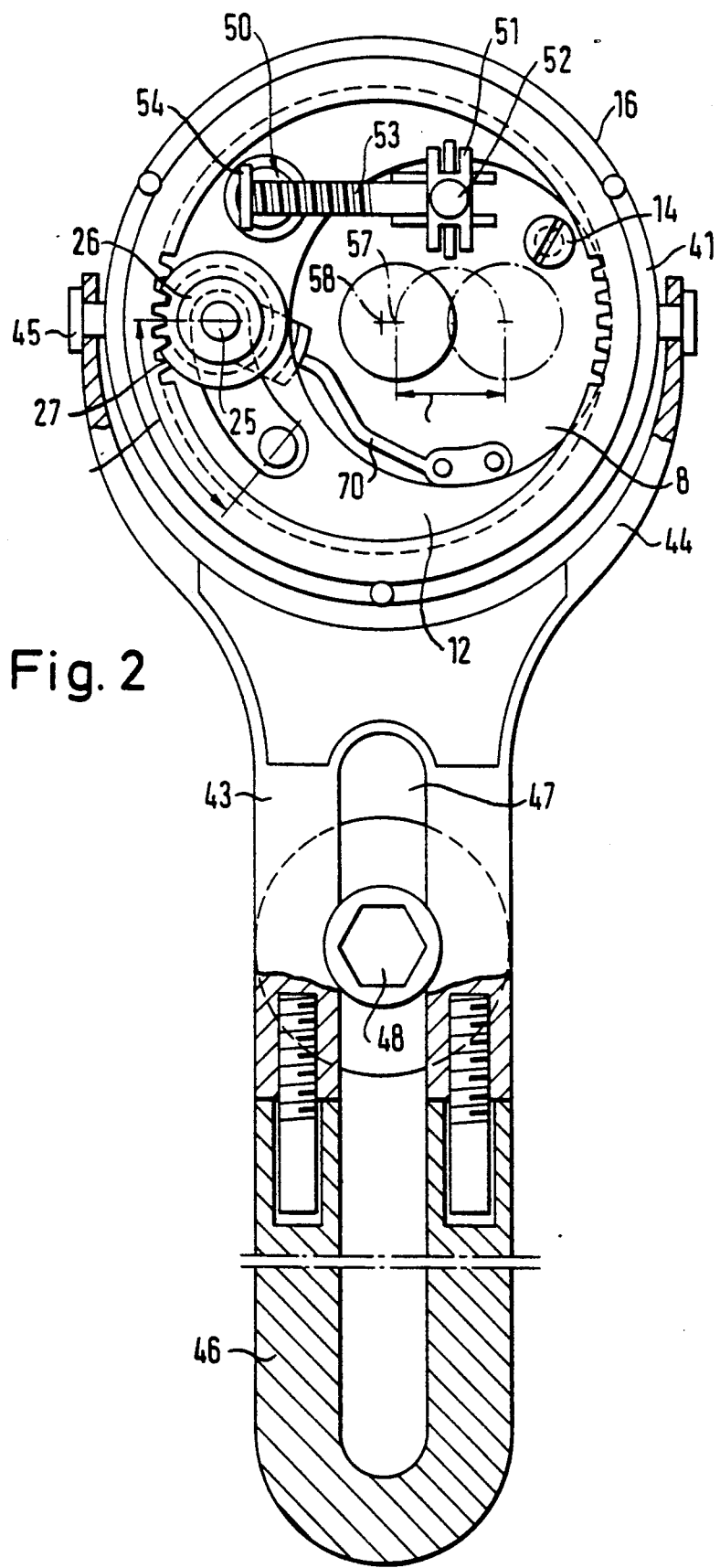
FIG. 2 is a section through the equipment shown in FIG. 1, along the line II—II.
Figure 3:
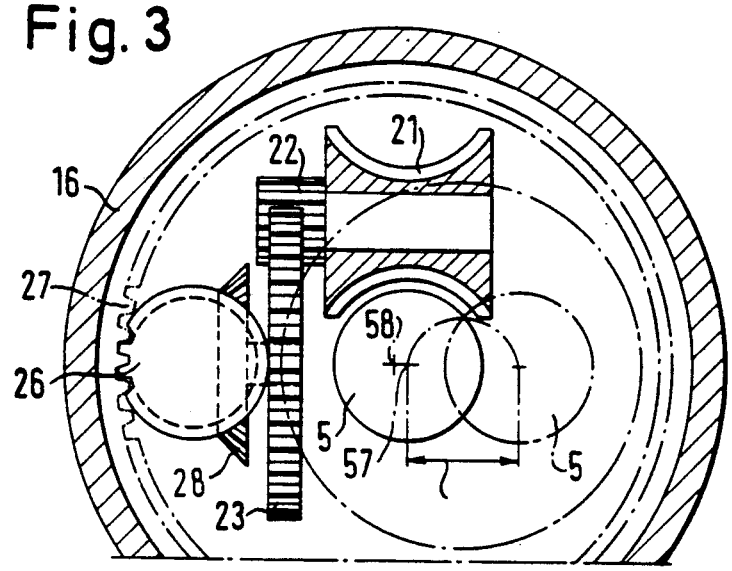
FIG. 3 is a section through the equipment shown in FIG. 1, along the line III—III.
Figure 4:
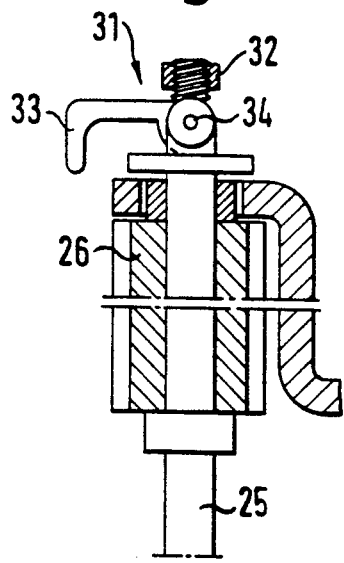
FIG. 4 is a representation of a detail on a larger scale.

In addition, it is shown in FIG. 2 that the retaining stirrup 43 has a semi-circular fork-shaped end portion 44 that can be attached to the holder 16 by means of the screws 45. The retaining stirrup 43 can be provided with an attachable extension part 46 which expediently has a longitudinally-directed elongated slot 47. This is used for insertion of the fastening screw 48 to attach the retaining stirrup 43 rigidly to the working material, for example by screwing into a previously prepared tapped hole and, so that the drive connection between the pinion 26 and the crown wheel 27 as well as the lower bearing of the shaft 25 can always be retained in the correct position with freedom from play, a spring-loading device 70 is provided in the holder.

Figure 6:
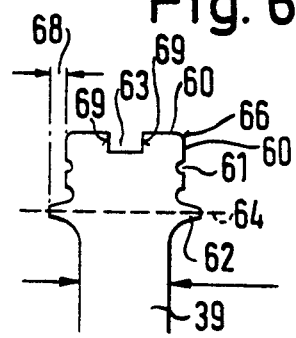
FIG. 6 is a representation of part of the tool shown in FIG. 5, on a larger scale.
Figure 5:
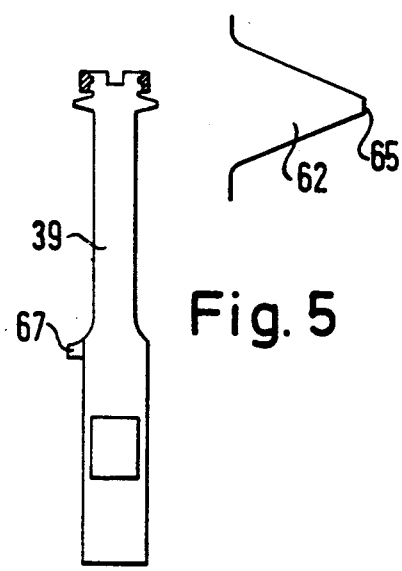
FIG. 5 is a side elevation of a tool for use in combination with the equipment shown in FIGS. 1 to 4.

The cutting tool 39 which is depicted in FIGS. 5 and 6 is generally a face-milling cutter with a central recess 63 and lateral pitch diameter cutting blades 69, the cutting blades 60 of which are arranged for left-hand cutting for down-milling, which imparts an outstandingly good quality to the surface. The cutting height of the cutting blades 60 of the face-milling cutter corresponds to a single pitch of the thread being cut in the tapped hole. A peripheral groove 61 of small width and depth is located above the cutting blades 60 of the face-milling cutter to act as a chip breaker. At a further distance away from the cutting blades 60 of the face-milling cutter, the tool 39 is provided with radially-projecting thread-cutting teeth 62. The thread-cutting teeth 62 are arranged in a plane 64 at right angles to the axis 63 of the tool 39 and have an equilateral cross-section shape with an end surface 65 which is co-axial with the axis of the tool 39. Lastly, the cutting blades 60 of the face-milling cutter are rounded off to pass over into the peripheral surface of the face-milling cutter with a curvature 66 of small radius. When introduced into CNC-machines, there is also a core-drill tooth 67 provided for deburring at a distance of approximately 1½ diameters away from the thread being cut. In addition, the currently necessary tooth height 68 must be maintained.

Comment

The milling machine described in the foregoing is intended for the production of metric right-hand threads, in which case all the cutting surfaces must have the required back-off clearance.

I claim:

1. An apparatus for producing an internally threaded drill hole in a solid material without predrilling, comprising:
    a thread cutting tool eccentrically guidable about a drill hole axis at a rotationally driven spindle of the tool, and axially displaceable, which tool has an end face preceded by cutters so as to produce hole;
    means for rotationally driving the tool spindle;
    a cylindrical rotatable spindle housing in which the tool spindle is mounted so as to be radially adjustable, the spindle housing having an external guiding thread portion (20);
    means for radially adjusting the tool spindle, said adjusting means including axially spaced eccentric plates connected with one another and mounted for rotation in and with respect to and eccentric to the axis of the spindle housing, and the spindle being mounted for rotation in the eccentric plates about an axis eccentric to the axis defined by the plates, means for rotating the eccentric plates with respect to the spindle housing, and means for fixing the eccentric plates against rotation with respect to the housing;
    a holder placeable on a workpiece to be machined and having an internal further guiding thread portion (19), the spindle housing (15) being disposed in the holder so that the guiding thread portion (20) is in engagement with the further guiding thread portion (19) disposed at the holder; and
    means for rotationally driving the spindle housing from rotation of the tool spindle so that said housing is axially displaced by the engagement between the guiding thread portions, the axial displacement of the spindle housing causing the cutting tool to be axially displaced, the tool spindle drive means participating in the tool spindle's eccentric and axial movements.

2. An apparatus according to claim 1, wherein the drive means of the spindle housing (15) includes a worm (21) meshing with the tool spindle (5) and a pinion (26) rotating about a fixed shaft (25) and meshing with an internally toothed rim (27) fixed on the holder (16), the worm (21) driving via a gear pair (22, 23) a first bevel gear (28) rotating about an axis oriented crosswise to the axis (57) of the tool spindle (5) and said bevel gear driving a second bevel gear non-rotationally connected with the shaft (25) of the pinion (26).

3. An apparatus according to claim 2, wherein said second bevel gear comprises one of two bevel gears (28, 30) spaced from each other and are disposed for axial displacement on the shaft (25) connected with the pinion (26), for each intended direction of rotation of the spindle housing (15) one of these bevel gears is engageable with the bevel gear (24) driven by the worm (21), the pinion (26) being connectable with the shaft (25) carrying the bevel gears through a clamping connection non-rotationally with torque adjustment, a nut (32) is disposed on the shaft (25) cooperating with an eccentric (34) pivotable about an axis (57) oriented crosswise to the shaft (25), and the eccentric (34) in turn is adjustable back and forth between at least one active and one inactive position by a jib (33).

4. An apparatus according to claim 2, wherein the holder is formed by a tube provided over a portion of its length with the guiding thread portion (19), the rim (27) associated with the pinion (26) being disposed in the area of an upper end face of the holder (16).

5. An apparatus according to claim 3, wherein the jib (33) connected with the eccentric (34) is abuttable on the holder (16) after a maximum operating length is exhausted so as to pivot the eccentric (34) into its inactive position, so that the pinion (26) is freely movable relative to the shaft (25).

6. An apparatus according to claim 2, wherein at one of the two eccentric plates (8, 9) a spindle (53) is engageable via a pin (52) and eye (51), the spindle (53) having a spindle nut (54) supported against an abutment disposed at a fixed part of one of a cover (12) and a bottom (13) of the spindle housing (15), the tool spindle (5) being supported in a sleeve (3) which receives it via ball baring means (6) and fixed through the sleeve (3) in the eccentric plates (8, 9) of the spindle housing, the sleeve (3) being divided into a part connectable with a housing of the spindle drive means (1) and a part permanently disposed in the spindle housing (15).

7. An apparatus according to claim 4, and further comprising a torque support for a hand drilling machine fixed on the holder (16) so as to protrude upward, the torque support including a yoke (37) and cooperating with a supporting rod (35) which in turn is fastened in radial overhang on a sleeve (3) non-rotationally connected with a housing (1) of the spindle drive means and receiving the tool spindle (5), the spindle housing (15) further having at each of its upper and lower ends a guide ring (18) arranged so as to cooperate with an inner circumference surface of the tubular holder.

8. An apparatus according to claim 6, wherein the holder (16), the spindle housing (15) and the sleeve (3) receiving the tool spindle (5) having mutually congruent window openings arranged so as to allow access to a clamping point of the cutting tool.

9. An apparatus according to claim 1, wherein the holder (16) has a lower end provided with adjustable centering tips (42) which protrude past its end faces, the holder (16) also having at its lower end attachment means for connecting a yoke (43) which in turn has means for securing the apparatus on a workpiece in a selected position.

10. An apparatus according to claim 6, wherein the sleeve (3) receiving the tool spindle (5) has in a region outside the spindle housing (15) a radially directed connection for a compressed air line (38) and contiguous to its lower end face the holder (16) has an outlet opening (40) for compressed air for chip ejection, the tool spindle being hollow.

11. An apparatus according to claim 1, wherein the cutting tool has additional circumferential cutters which produce thread spirals, the cutters (6) produce the core hole, and opposite them the additional cutters (62) which produce the thread spirals are disposed at an axial distance.

12. An apparatus according to claim 11, wherein the cutters (62) which produce the thread spirals are disposed in one plane.

13. An apparatus according to claim 11, wherein the cutters (60) which produce the core hole have an offset circumferential groove (61) disposed as a chip breaker.

14. An apparatus according to claim 11, wherein the cutters (60) which produce the core hole have a central cutout (63) with lateral flank cutters (69), a transition from the cutters (60) which produce the core hole to the flank cutters having one of a radius (66).

15. An apparatus according to claim 11, wherein a core drill tooth (67) is disposed above the additional thread cutters (62) for deburring the thread being cut.

16. An apparatus according to claim 11, wherein a depression is provided between the cutters (60) and the additional thread cutters (62).

17. An apparatus according to claim 11, wherein the tool is usable in CNC-controlled milling and drilling machines.

* * * * *